TERMINALLY LITHIATED POLYBUTADIENE JOINED WITH 2-CHLOROBUTANE

TERMINALLY LITHIATED POLYBUTADIENE JOINED WITH 2-CHLOROBUTANE 3,639,367
JOINING LIVE POLYMERS BY MEANS OF MONOHALOGEN COMPOUNDS
Adel F. Halasa, Bath, Ohio, assignor to The Firestone Tire & Rubber Company, Akron, Ohio
Continuation-in-part of application Ser. No. 575,967, Aug. 30, 1966. This application Oct. 8, 1969, Ser. No. 864,584
Int. Cl. C08d 5/04, 3/08, 3/12
U.S. Cl. 260—85.1       6 Claims

ABSTRACT OF THE DISCLOSURE

Rubber molecules are joined by an organic compound which comprises a single halogen atom.

---

Figure 1:
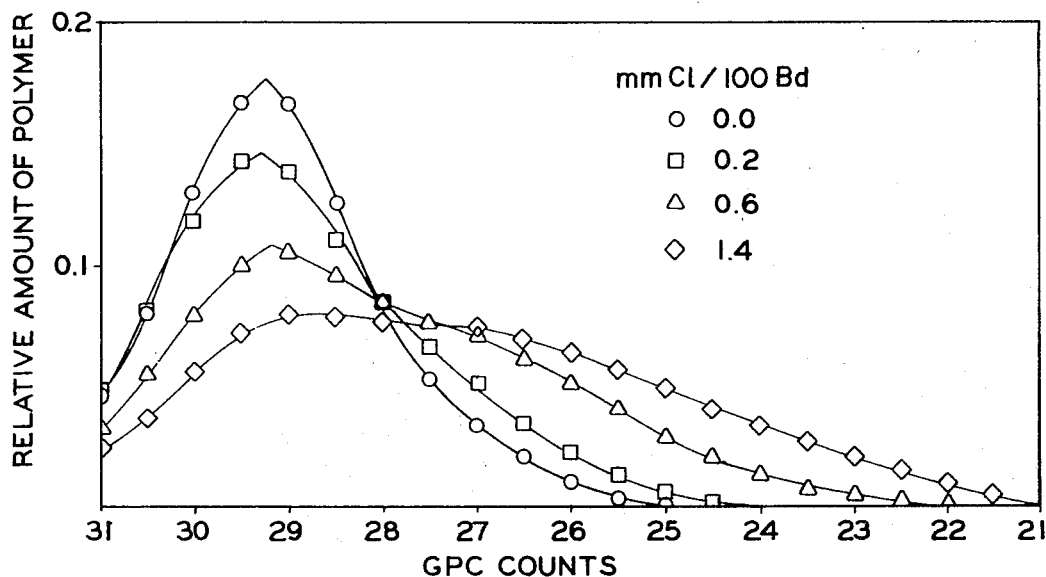

This application is a continuation-in-part of my application Ser. No. 575,967, filed Aug. 30, 1966 (now abandoned).

The invention relates to novel branched polymers and to a novel method of making them. The term "polymer" is used herein to include both homopolymers and copolymers.

Polymers of diene monomers often are difficult to fabricate into useful shapes and commercially practical products or are deficient in physical properties desired for such shapes or products. Such polymers include homopolymers of conjugated dienes of 4 to 6 carbon atoms (e.g. butadiene, piperylene, isoprene, 2,3-dimethylbutadiene) and copolymers thereof (e.g. butadiene-isoprene, piperylene-butadiene, etc.) and copolymers of such conjugated dienes with isobutylene (butyl rubber), styrene, a hydrocarbon-substituted styrene such as methylstyrene and ethylstyrene, copolymers of butadiene and isoprene with styrene or such substituted styrenes, natural rubbers, chloroprene and copolymers thereof with butadiene and/or isoprene and/or styrene or an EPDM rubber (i.e. a rubber in which ethylene and propylene are copolymerized with an unconjugated diene monomer of about 5 to 12 carbon atoms which may be dicyclopentadiene, cyclooctadiene, hexadiene-1,4, methylene norbornene, ethylidene norbornene or other non-conjugated diolefin). Block copolymers as well as other copolymers can be used. The foregoing include the so-called stereo rubbers which have been of great interest in recent years, but the properties of most of these new synthetic rubbers have not been completely satisfactory for all uses, as witness the widespread practice of blending such rubbers with natural rubber or emulsion SBR.

The stereo rubbers may be produced by polymerization of isoprene or butadiene-1,3 by means of a catalyst which is a hydrocarbon-soluble hydrocarbon derivative of an alkali metal, for example, an alkyl, alkenyl, cycloalkyl, cycloalkenyl, aryl or alkaryl derivative. Preferred linear, rubbery polymers of vinylidene monomers are prepared by polymerization of a conjugated diolefin by means of a lithium-hydrocarbon catalyst in the absence of air and moisture; copolymers of butadiene and isoprene or of either or both such diolefins with styrene or methylstyrene are produced by the same technique.

The preferred polymerization catalyst is n-butyllithium. Derivatives of the alkali metals (and particularly lithium, sodium and potassium) which are catalysts include the ethyl, butyl, amyl, hexyl, cyclohexyl, 2-ethylhexyl, n-dodecyl, n-hexadecyl, allyl, benzyl, crotonyl, cyclohexenyl, camphyl, isobornyl, phenyl, tolyl, xylyl, naphthyl and xenyl alkali metals as well as di-metal derivatives which include derivatives of ethylene, trimethylene, tetramethylene, decamethylene and octadecamethylene; 1,2-dimetalated propane, 1,4-dimetalated benzene, 1,5-dimetalated naphthalene, 1,2-dimetalated-1,3-(diphenyl) propane, etc.

The polymerizations are usually carried out at atmospheric pressure, but pressures greater and less than atmospheric may be employed. The reaction is advantageously carried out in a hydrocarbon compound, preferably a non-ether and usually pentane or hexane, usually at an elevated temperature below the temperature of the boiling point of the solvent, but higher temperatures may be used and temperatures as low as −70° C. or lower may be employed. A small amount of the catalyst is all that is required, and usually from about 0.001 to about 0.5 gram of catalyst will be employed for each 100 parts of the monomer. Such linear polymers are characterized by high 1,4-conent (85–95% of polymer derived from butadiene or isoprene), when produced in a hydrocarbon solvent. They are characterized by high linearity and narrow molecular weight distribution. The vulcanizates of such polymers are characterized by excellent physical proporties, including high resiliency, low hysteresis, excellent resistance to abrasion, low running temperatures and excellent flexibility and retention of other good physical properties at extremely low temperatures typical of the Arctic in winter, all in comparison with standard emulsion polymerizates, such as commercial SBR. However, such lithium-catalyzed polymers are more difficult to process in standard rubber equipment, such as Banbury mixers, mills and tubers, as compared to natural rubber and conventional (emulsion) SBR, so that they are usually mixed with natural rubber and/or SBR for commercial use. Certain of such polymers produced by lithium catalysts also possess undesirable cold-flow properties.

There are other diene polymers produced by polymerization of butadiene and/or isoprene with or without other monomers, e.g., styrene, etc., by means of other catalysts. Polymers of lower 1,4-content are produced by lithium catalysts in the presence of Lewis bases. All such diene polymers may be treated by the process of this invention.

It is an object of the invention to overcome the disadvantages of any such polymers of diene monomers, to provide novel branched polymers of high molecular weight having unexpectedly improved properties and to provide a novel method of making novel polymers of increased molecular weight and wider molecular weight distribution.

The polymers used in the invention are rubbers. Often they are liquid rubbers (having molecular weights of 1,000 to 30,000) or soft rubbers (having average molecular weights up to about 300,000), but useful results are obtained with polymers of higher molecular weights (as high as about 2,000,000). Rubbery products are obtained by joining polymers of such lower molecular weights.

In accordance with the invention, the polymer treated is a live polymer, i.e. it has one or more "live ends." A relatively low molecular weight live polymer of a diene monomer or copolymer derived at least in part from a diene monomer, is reacted with a joining agent which comprises a saturated or unsaturated, straight-or branched-chain or cyclo-containing hydrocarbon which includes one to twenty or fifty or more carbon atoms per molecule and halogenated with a single halogen which may be on a primary, secondary or tertiary carbon atom of an aliphatic compound. The joining agent may comprise other electron-withdrawing groups which are on carbons. Such electron-withdrawing groups may or may not enter into the joining reaction. Such active groups include ketone, aldehyde, ether, hydroxy, oxide, nitro-vinyl, ester, anhydride, amine, acid, thio, sulfonate, sulfide and unsaturated, etc. groups. The halogens of the joining agent may be fluorine, chlorine, bromine and/or iodine or mixed halogens.

Uraneck et al. 3,135,716 describes a process of combining two polymers by a linking chain using a joining agent having a halogen atom at each end thereof. That reaction is illustrated in the patent by an equation in which two molecules of a straight chain polymer are reacted with a joining agent having two terminal chlorine atoms, and the product is a straight chain polymer product which comprises the two starting polymers which have replaced the halogens of the joining agent. Uraneck lists 1,2-dibromoethane, 1,4-dichlorobutane and 1,4-dichloronaphthalene as possible joining agents. The joining agents of the present invention which are aliphatic, include only one halogen atom, sec.-butyl chloride being preferred. This does not react as a linking chain as do the Uraneck joining agents which comprise two halogens which are replaced by the polymers. An entirely different reaction is involved. Other joining agents which may be used in carrying out the invention include 1-chlorobutane
1-chloropropane
2-chloropropane
1-chloropentane
2-chloropentane
3-chloropentane
4-chlorobutene-1
4-chloropentene-2
2-chlorobutene-1
2-chlorohexene-1
5-chlorohexene-1
4-chlorohexene-2
2-chlorohexene-3
chloroprene
1-chlorohexane
chlorocyclohexane
chlorocyclooctane
1-chloro-2-methylbutane
1-chloro-3-methylbutane
2-chloro-2-methylbutane
1-chloro-2-methylpropane
2-chloro-2-methylpropane
1-chloro-4-ethylheptane
1-chlorooctane
2-chlorodecane
1-chloroeicosane
benzyl chloride
o-xylylchloride
m-xylylchloride
tert.-butyl chloride
tt-octyl chloride
phenyl chloride
naphthyl chloride nuclearly substituted chlorotoluenes, vinyl naphthalenes, xylenes, etc., and corresponding bromo-, iodo- and fluoro-derivatives.

The polymers which are used with the joining agent are live polymers; that is, they are polymers that comprise a lithium atom (or other alkali metal atom, such as a sodium or potassium, etc. atom) which is active in polymerization of the polymer. The live polymer may be obtained by polymerizing 1,3-butadiene, or other monomer such as is contemplated herein, with n-butyllithium initiator, or other lithium or other alkali metal initiator, or it may be obtained by replacing one or more hydrogens of a dead polymer with an alkali metal using any suitable procedure.

We feel that this joining reaction is caused by one electron transfer from the organolithium to the monohalogen compounds which causes the joining. Similarly, joining can be explained by a transient radical intermediate.

The joining agent is added to the reaction mixture after substantial completion of the polymerization reaction.

The process of the invention includes reactions of one or more of such polymers, with one or more of the halogen-containing joining reagents of this invention. The process of the invention is carried out at any temperature at which appreciable reaction occurs, generally in the range of −75° C. to 275° C. and preferably in the range of 0° C. to 150° C. The reaction can be carried out under reduced pressure, atmospheric pressure or at superatmospheric pressures. Especially when the reaction is conducted in a volatile solvent or solvent mixture containing a volatile fraction, superatmospheric pressures are convenient to allow use of reaction temperatures above those to which the reaction would be confined at atmospheric pressure. It is usual to employ a higher temperature than with a chloride or bromide joining agent. In the reaction of the invention there is normally utilized sufficient strong base to provide from 0.01 to 10 and preferably 0.1 to 1.0 equivalent of alkali metal per atom of halogen contained in the halogen-containing compound. The mechanisms by which the reaction of the invention increases molecular weights of polymers is not known but may involve formation of radicals of which the halogen-containing compounds are precursors.

The novel polymers produced by the invention from hydrocarbon-lithium catalysts are characterized by improved processing properties, in comparison with polymers which have not been reacted in accordance with the invention or in comparison with similar polymers produced by other catalysts, such as Ziegler catalysts, etc., and having molecular weights comparable to those of the novel polymers. The novel polymers, when rubbery, behave in rubber mills, Banbury mixers and extruders as satisfactorily as do emulsion polymers of the conventional SBR types. The novel rubbery polymers are readily utilized in practical rubber compounds without admixture of natural rubber or conventional SBR, although such other rubbers can be mixed with the novel polymers if desired.

The novel polymers have higher average molecular weights, normally averaging 20 percent to several hundred percent higher than the average molecular weight of the polymer before reaction in accordance with the invention. The novel polymers are much less linear than the linear starting polymers and are often highly branched. The novel polymers are solids with reduced (or no) tendency to cold-flow and present no packaging or shipping problems. The novel rubbery polymers can be extensively extended with oil (as with 37.5 parts oil per 100 parts polymer) without objectionable cold flow.

The novel rubbery polymers provide vulcanizates having higher moduli than comparable vulcanizates of comparable prior art polymers. This property enhances the value of the novel polymers for many industrial uses, and especially in tire treads and carcass compositions. Vulcanizates of the novel polymers produced from the stereo synthetic rubbers also, surprisingly, possess the high resilience, high efficiency, low running temperature, high dynamic modulus and low internal friction properties characterizing the starting polymers, and hence are much superior in these respects to vulcanizates of conventional emulsion polymers.

Figure 2:
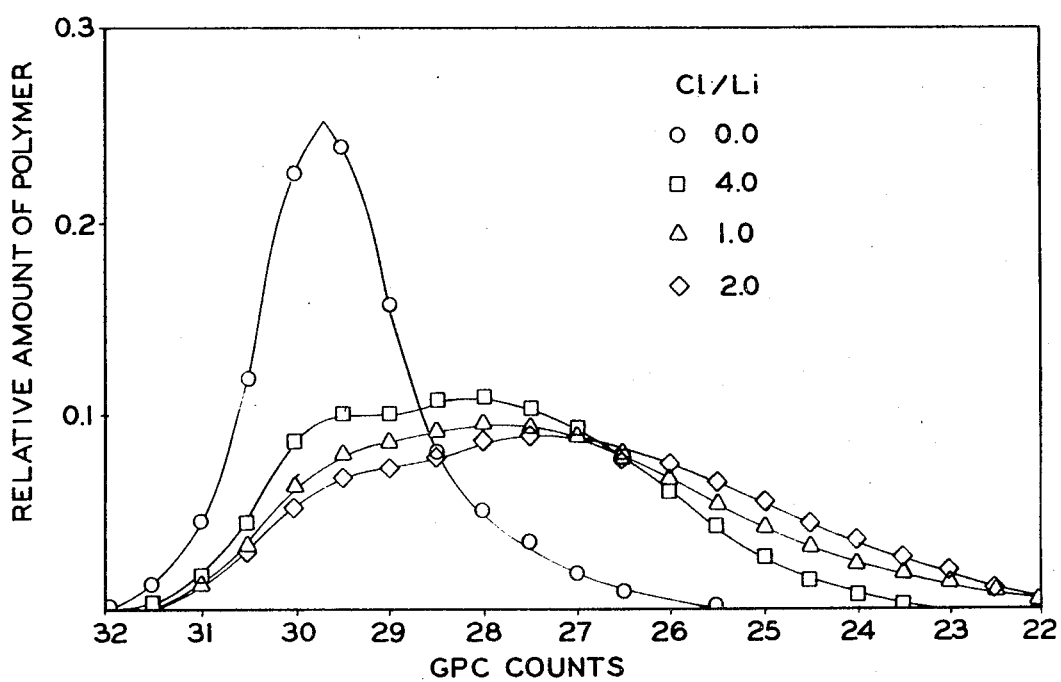

FIGS. 1 and 2 are gel-permeation chromatograph (G.P.C.) curves discussed in Example 1.

EXAMPLE 1

In the case where live cements of linear polybutadiene, or polyisoprene, or copolymers thereof, are reacted with secondary butyl chloride, which is a monohalogen aliphatic hydrocarbon, the molecular weight distribution as depicted by FIGS. 1 and 2, shows that these polymers are joined in a different manner from that disclosed by Uraneck et al. 3,135,716. The bimodal character of the distribution in combination with the high molecular weight tail produced (as shown in FIGS. 1 and 2) is indicative of a combination of joining and cross-linking reactions. It is significant that no evidence of gel was found even at the higher levels of the monohalide used. The position of the high molecular weight peak of the bimodal curves in FIGS. 1 and 2 corresponds approximately to four times the molecular weight of the original polymer. A close analysis of the G.P.C. tail at lower G.P.C. counts of FIGS. 1 and 2 indicates that the molecular weight of the joined polymers is in the high millions. This suggests that a controlled cross-linking mechanism is operative in this process.

EXAMPLE 2

Butadiene-1,3 (Bd) was polymerized in hexane solution, using different amount of n-butyllithium (BuLi) as initiator, at 50° C. for 18 hours. Samples of the live polymer were joined by heating with sec.-butyl chloride (sec.-BuCl) at 70° C. for 12 hours. Details of the reactions and properties of the joined polymers are given in Table II in which the amount of the reagents are expressed in millimoles (mmoles). The Mooney viscosity (ML/4/100° C.) is given for the polymer, and both the Mooney viscosity and DSV are given for the joined product and show joining has occurred.

TABLE II

| | Polymerization of BD | | Joining agent, Mmoles of sec.-BuCl | Physical properties of polymers | | |
|---|---|---|---|---|---|---|
| | Mmole BuLi | ML/4 at 100° C. | | ML/4 at 100° C. | DSV¹ | GEL |
| Run: | | | | | | |
| 2A | 0.47 | 7 | None | | | (²). |
| 2B | 0.47 | 7 | 0.50 | 31.0 | | (²). |
| 2C | 0.47 | 7 | 0.25 | 62.0 | | (²). |
| 2D | 0.47 | 7 | 0.125 | 90.0 | | (²). |
| 2E | 0.62 | 12 | None | 12.0 | 1.48 | None. |
| 2F | 0.62 | 12 | 0.085 | 69.0 | 2.60 | Do. |
| 2G | 0.62 | 12 | 0.35 | 94.0 | 2.92 | Do. |
| 2H | 0.62 | 12 | 0.50 | 126.0 | 3.12 | Do. |
| 2I | 0.62 | 12 | 0.67 | 100.8 | 2.97 | Do. |
| 2J | 0.62 | 12 | 0.70 | 91.8 | 2.66 | Do. |
| 2K | 0.62 | 12 | 1.40 | 70.2 | 2.50 | Do. |

¹ Dilute solution viscosity. ASTM-D 1601-61, Pt 27, June 1967, page 531.
² No data was obtained.

EXAMPLE 3

A solution of about 16 percent of copolymer of styrene and butadiene of substantially constant composition (i.e. without an appreciable percentage of polystyrene blocks) was prepared from 10.8 grams of styrene and 38.4 grams of butadiene-1,3 by polymerization in a hydrocarbon solvent using n-butyllithium as catalyst. The copolymer had a Mooney viscosity (ML/4/100° C.) of 21.5 and a Williams Recovery value of 1.35. Molecules of the live polymer were joined by the addition of 0.20 millimole of sec.-butyl chloride at 70° C. In several hours the product had a Mooney viscosity (ML/4/100° C.) of 90 and a Williams Recovery value of 3.41.

EXAMPLE 4

The polybutadiene used in this example was prepared by polymerizing 1,3-butadiene in hexane using n-butyllithium as catalyst initiator. The polybutadiene had a Mooney viscosity (ML/4/100° C.) of 18. The live polymer was heated with sec.-butyl chloride and its molecular weight was thereby increased to produce a polymer with a Mooney viscosity (ML/4/100° C.) of 180. Prior to heating with sec.-butyl chloride, the polybutadiene had objectionable cold flow. After such joining it exhibited no cold flow and produced vulcanizates having higher stress-strain properties and lower hysteresis properties compared to comparable vulcanizates of the original polybutadiene.

The polymer was sampled during the joining reaction, and the molecular weight distribution (MWD) curve was obtained for each sample. It was noted that such MWD became broader as the joining reaction progressed. The MWD curve of a butadiene-styrene copolymer produced in solution with n-butyllithium initiator and then joined by reaction with sec.-butyl chloride is broader and is skewed to higher molecular weight polymers, in comparison with the MWD curve of the unjoined polymer. Typically, the average molecular weight of such joined polymer is more than three times the average molecular weight of the unjoined polymer.

Like results are also obtained by joining polybutadiene and butadiene-styrene copolymers by reaction with other alkyl chlorides, particularly sec.-alkyl chlorides in which there is a single halogen and the alkyl group contains 1 to 30 carbon atoms. Such polymers after joining are particularly valuable when extended by plasticizing with aromatic or aliphatic oils, such as are commonly used in extending rubbers. Generally 10 to 50 parts of oil will be used with 100 parts of the joined butadiene polymer.

Attention is called to the improved Williams plasticity recovery and CEPAR (Cure-Extrusion-Plasticity-And-Recovery) values of polybutadienes and butadiene-styrene copolymers the molecular weight of which have been increased by the joining reaction described herein. For a polymer which resists cold flow, the Williams plasticity recovery value must be at least 0.75 and the CEPAR value must be less than 5. The Williams plasticity recovery value of the oil-extended joined polymers is preferably at least 1.70.

The CEPAR value and instrument for determining it are described in The CEPAR Apparatus by Claxton and Conant in Rubber World 143, No. 2 (November 1960), pages 71–78 and 83) and in The Characterization of Rubber Processing Operations by the same authors in Rubber Age 97, No. 7 (October 1965), pages 80–85.

The above stereolinear polybutadiene of 18 Mooney viscosity after being joined so as to have a Mooney viscosity of 180, had a Williams plasticity recovery value of 4.10; the CEPAR polymer flow rate at 50° C. and 10 p.s.i./mm./hr. was zero.

The novel polymers can be blended with other known polymers to provide useful commercial compositions for fabrication into useful shapes and articles. The novel rubbery polymers are advantageously blended with known rubbers (e.g., natural rubber, butadiene-styrene copolymer, polybutadiene, polyisoprene, isoprene-isobutylene copolymer, chloroprene, isoprene-styrene copolymer), with or without extending oils, for forming vulcanizates of great technical importance. The novel rubbery polymers are advantageously compounded with the known reinforcing carbon blacks to produce useful commercial stocks, which may also contain one or more additional rubbery polymers, and may also contain 5 to 100 phr. (parts per 100 parts of the rubber) of extending oil or plasticizer. Sulfur and other known vulcanizing agents for natural rubber and the commercial synthetic rubbers are useful for forming vulcanizable stocks containing a novel polymer of the invention. Known antioxidants, stabilizers and antiozonants for natural and commercial synthetic rubbers find similar utility in compositions containing the novel polymers of the invention. Known methods of mixing, forming, fabricating and curing compositions of natural and commercial synthetic rubbers are applicable to and useful with compositions containing the novel polymers of the invention. The novel polymers of the invention are especially useful in pneumatic tire tread, sidewall and carcass compositions, and the considerations of this paragraph are especially relevant to the use of the novel polymers in tires.

I claim:

1. The method of joining live polymers from the class consisting of polymers and copolymers derived at least in part from a conjugated diene monomer and containing a replaceable alkali metal atom obtained by reaction with an alkali metal hydrocarbon as the polymerization initiator, which method comprises joining the same by reacting the same with a joining agent which is of the class consisting of aliphatic and aromatic mono-halogenated saturated, unsaturated, branched-chain, straight-chain and cyclo-containing hydrocarbons of 1 to 50 carbon atoms.

2. The method of claim 1 in which the joining agent is an aliphatic compound.

3. The method of claim 1 in which the live rubber polymer is a live polybutadiene.

4. The method of claim 1 in which the live rubber polymer is a live butadiene-styrene copolymer.

5. The method of claim 1 in which the joining agent is a mono-chloro alkane of 1 to 30 carbon atoms.

6. The method of claim 1 in which the joining agent is secondary butyl chloride.

References Cited

UNITED STATES PATENTS

| 3,078,254 | 2/1963 | Zelinski et al. | 260—45.5 |
| 3,135,716 | 6/1964 | Uraneck et al. | 260—45.5 |
| 3,318,862 | 5/1967 | Hinton | 260—94.2 |
| 3,382,225 | 5/1968 | Naylor | 260—94.3 |
| 3,468,972 | 9/1969 | Hsieh | 260—836 |

JOSEPH L. SCHOFER, Primary Examiner

W. F. HAMROCK, Assistant Examiner

U.S. Cl. X.R.

260—94.2 M, 94.7 HA